(12) United States Patent
St. Gray et al.

(10) Patent No.: US 12,479,292 B2
(45) Date of Patent: Nov. 25, 2025

(54) TEMPORARY TORQUE CONTROL SYSTEM

(71) Applicant: NISSAN NORTH AMERICA, INC., Franklin, TN (US)

(72) Inventors: Erik St. Gray, Tacoma, WA (US); Stefan Witwicki, San Carlos, CA (US); Nikhil Gowda, San Francisco, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 391 days.

(21) Appl. No.: 17/877,871

(22) Filed: Jul. 29, 2022

(65) Prior Publication Data

US 2024/0034148 A1 Feb. 1, 2024

(51) Int. Cl.
B60K 26/02 (2006.01)

(52) U.S. Cl.
CPC ...... B60K 26/021 (2013.01); *B60K 2026/023* (2013.01)

(58) Field of Classification Search
CPC ............. B60K 26/021; B60K 2026/023
See application file for complete search history.

(56) References Cited

U.S. PATENT DOCUMENTS

| 10,654,476 B2 | 5/2020 | Wray et al. |
| 11,084,504 B2 | 8/2021 | Wray et al. |
| 11,113,973 B2 | 9/2021 | Wray et al. |
| 2003/0135317 A1* | 7/2003 | Hijikata ............ B60K 31/18 701/96 |
| 2019/0329771 A1* | 10/2019 | Wray ............ B60W 30/18154 |
| 2020/0097003 A1 | 3/2020 | Wray et al. |
| 2020/0098269 A1 | 3/2020 | Wray et al. |
| 2020/0269875 A1 | 8/2020 | Wray et al. |
| 2020/0331491 A1 | 10/2020 | Wray et al. |
| 2021/0157314 A1 | 5/2021 | Wray et al. |
| 2021/0157315 A1 | 5/2021 | Wray et al. |
| 2021/0188297 A1 | 6/2021 | Wray et al. |
| 2021/0200208 A1 | 7/2021 | Wray et al. |
| 2021/0237759 A1 | 8/2021 | Wray et al. |
| 2021/0240190 A1 | 8/2021 | Wray et al. |

FOREIGN PATENT DOCUMENTS

EP  1400435 A2 *  3/2004  ............ B60W 40/02

* cited by examiner

*Primary Examiner* — Rachid Bendidi
*Assistant Examiner* — Neit J. Nieves Flores
(74) *Attorney, Agent, or Firm* — Global IP Counselors, LLP

(57) ABSTRACT

A vehicle includes a vehicle pedal, a vehicle engine and an electronic control unit. The vehicle engine generates a torque output of the vehicle in accordance with an operation of the vehicle pedal. The electronic control unit controls the vehicle pedal between a normal state, an increased resistance state and a decreased resistance state. The vehicle pedal is less sensitive to driver pressure in the increased resistance state. The vehicle pedal is more sensitive to driver pressure in the decreased resistance state.

19 Claims, 9 Drawing Sheets

TEMPORARY TORQUE CONTROL SYSTEM

BACKGROUND

Technical Field

The present disclosure generally relates to a temporary torque control system. More specifically, the present disclosure relates to a temporary torque control system for a vehicle.

Background Information

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle.

SUMMARY

In view of the state of the known technology, one aspect of the present disclosure is to provide a vehicle comprising a vehicle pedal, a vehicle engine, and an electronic control unit. The vehicle engine generates a torque output of the vehicle in accordance with an operation of the vehicle pedal. The electronic control unit controls the vehicle pedal between a normal state, an increased resistance state and a decreased resistance state. The vehicle pedal is less sensitive to driver pressure in the increased resistance state. The vehicle pedal is more sensitive to driver pressure in the decreased resistance state.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
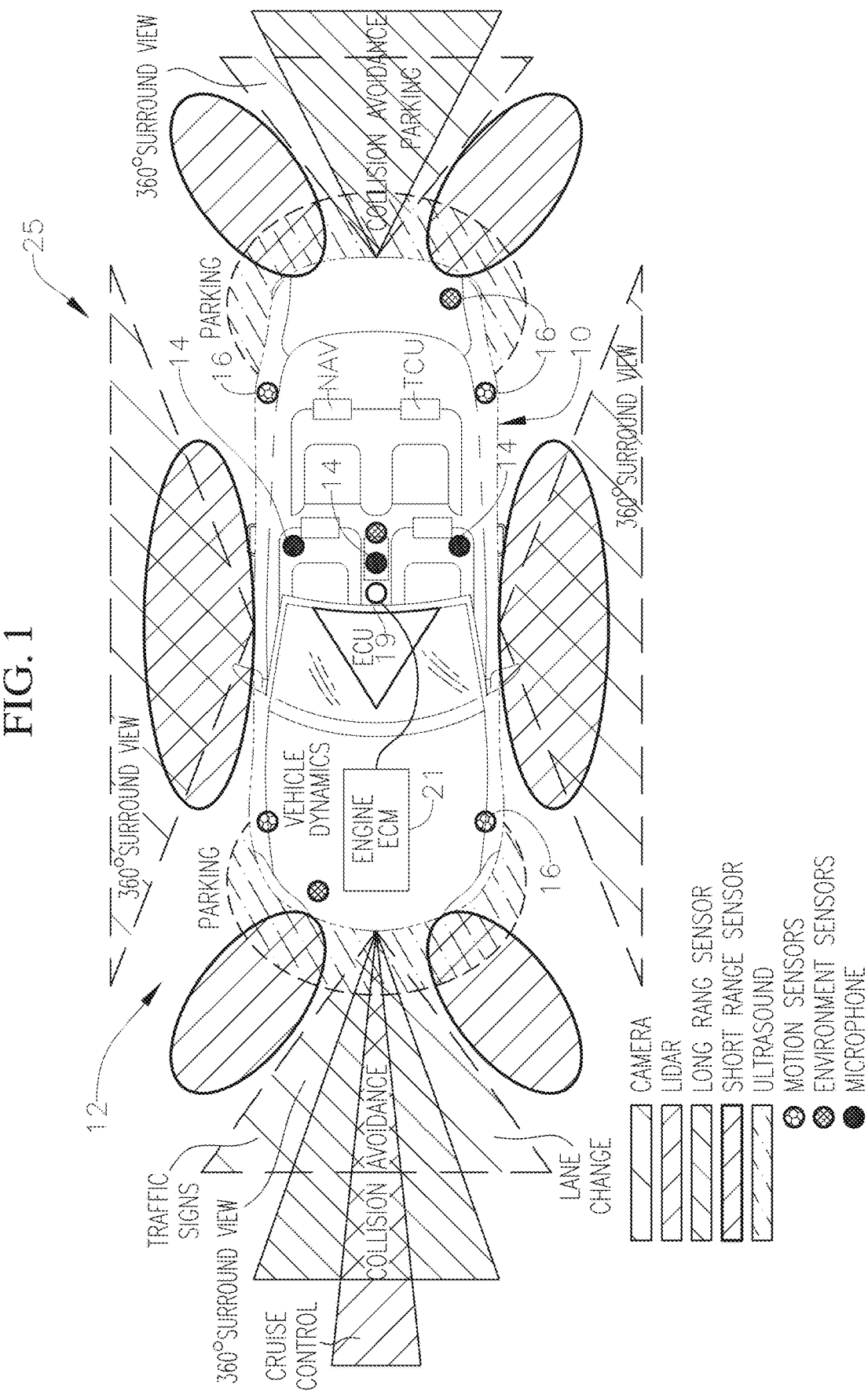
FIG. 1 is a top plan view of a vehicle equipped with a temporary torque control system that is schematically illustrated.
Figure 2:
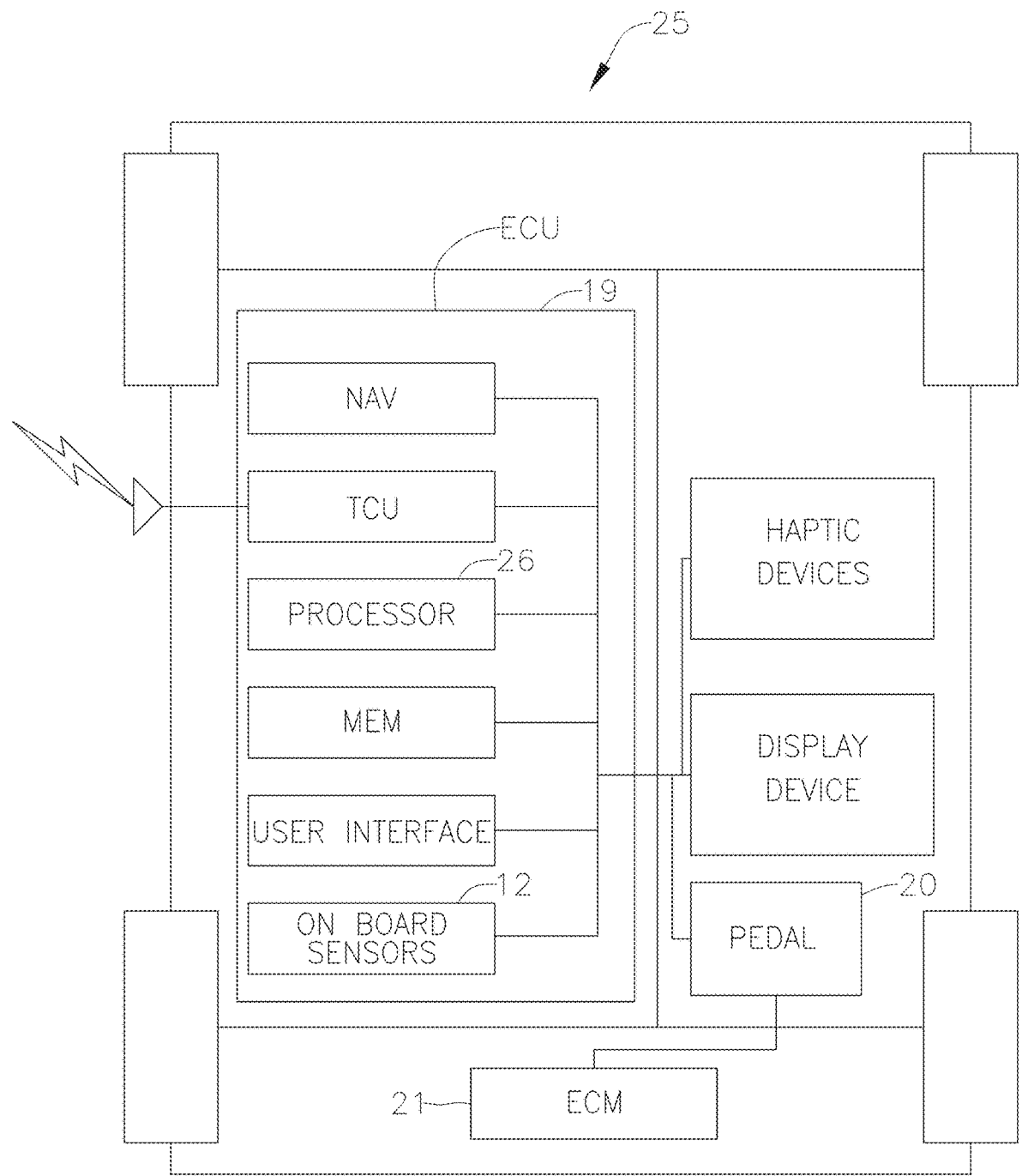
FIG. 2 is a schematic view of the components of the temporary torque control system.

Referring initially to FIG. 1, a vehicle 10 is schematically illustrated as being equipped with a plurality of control modules for navigation assistance. In the illustrated embodiment, the vehicle 10 is equipped with an on-board satellite navigation device NAV and a telematics control unit TCU, as best seen in FIGS. 1 and 2. The on-board satellite navigation device NAV and the telematics control unit TCU are considered examples of control modules for navigation assistance. The vehicle 10 is further equipped with an on-board sensor network 12 that monitors both internal and external conditions of the vehicle 10. That is, the on-board sensor network 12 includes internal sensors 14 to monitor conditions regarding the vehicle's 10 state as well as conditions with the vehicle's 10 passenger compartment.

The on-board sensor network 12 further includes environmental sensors 16 that monitor conditions regarding the vehicle's 10 vicinity. For example, the vehicle 10 can be equipped with one or more unidirectional or omnidirectional external cameras that take moving or still images of the vehicle's 10 surroundings. In addition, the external cameras can be capable of detecting the speed, direction, yaw, acceleration and distance of the vehicle's 10 relative to a remote object. The environmental sensors 16 can also include infrared detectors, ultrasonic detectors, radar detectors, photoelectric detectors, magnetic detectors, acceleration detectors, acoustic/sonic detectors, gyroscopes, lasers or any combination thereof. The environmental sensors 16 can also include object-locating sensing devices including range detectors, such as FM-CW (Frequency Modulated Continuous Wave) radars, pulse and FSK (Frequency Shift Keying) radars, sonar and Lidar (Light Detection and ranging) devices. The data from the environmental sensors 16 can be used to determine information about the vehicle's 10 vicinity, as will be further described below. The sensor network 12 further includes vehicle speed sensor 28s and torque sensor 30s to detect a navigation state of the vehicle 10.

Preferably, the internal sensors 14 includes at least one internal unidirectional or omnidirectional camera positioned to detect behavior of one or more passengers in the passenger compartment. The on-board sensor network 12 can further include internal microphone(s) positioned to detect behavior of one or more passengers in the passenger compartment. The internal sensors 14 are provided to detect the behavior of the vehicle's 10 driver and/or passenger(s). For example, the internal sensors 14 can detect a state of whether the driver is distracted, unfocused or unresponsive. Cameras and microphones can detect whether the driver is engaged with a conversation with another passenger and is not paying attention to the navigation system or road conditions.

Figure 4:
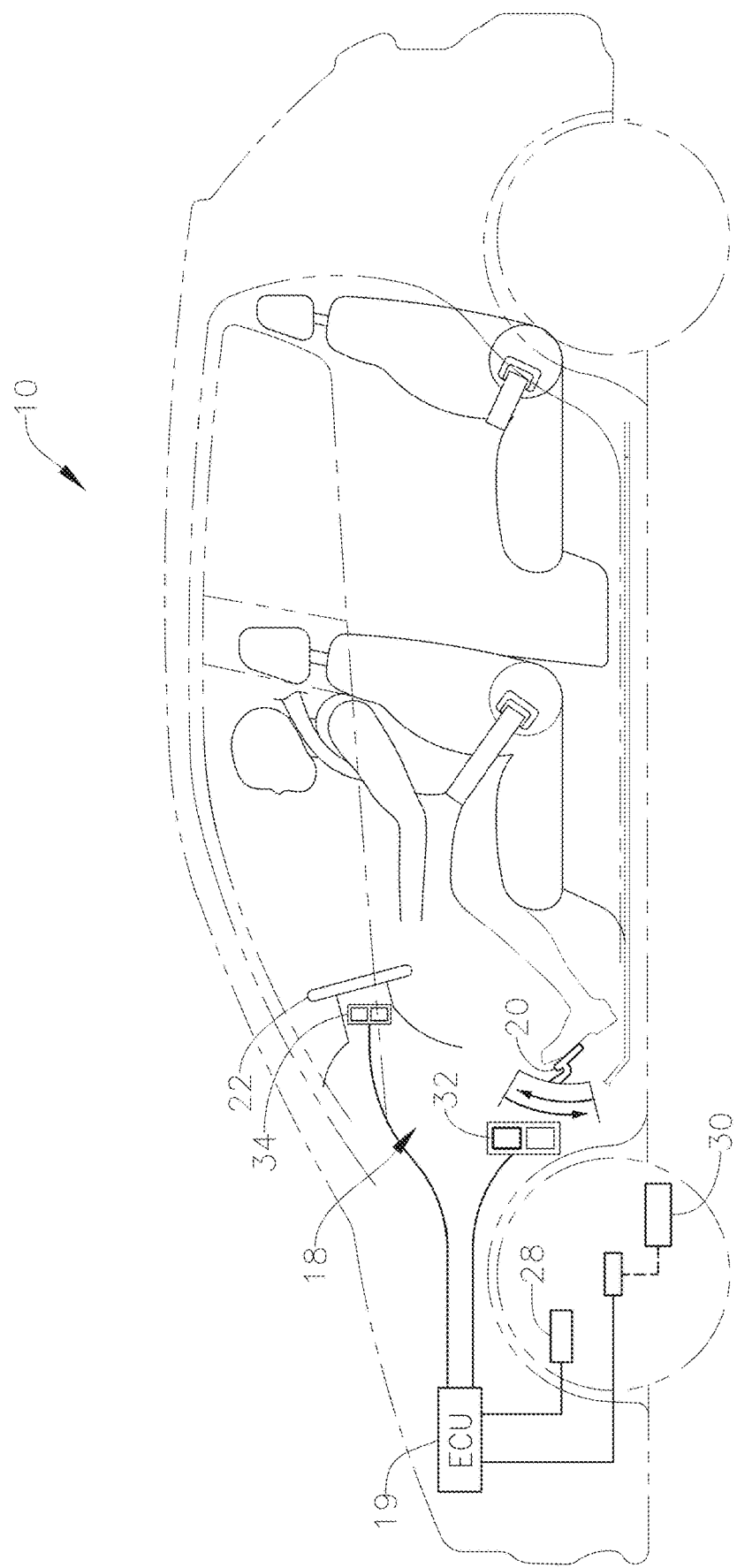
FIG. 4 is a schematic view of the operations of the temporary torque control system.

As shown in FIG. 4, the vehicle 10 is further equipped with a user operation device 18 for controlling an operation of the vehicle 10. In the illustrated embodiment, the term "user operation device 18" for the vehicle 10 includes any device used for controlling the vehicle's 10 behavior regarding torque, speed, direction, acceleration or deceleration. In the illustrated embodiment, user operation device 18 includes a vehicle pedal 20. The user operation device 18 further includes a steering wheel 22. Therefore, the vehicle 10 further includes the vehicle pedal 20 and the steering wheel 22. The user operation devices 18 listed are included as examples only. It will be apparent to those skilled in the vehicle field from this disclosure that the vehicle 10 can include additional or alternatively user operation devices 18 as needed and/or necessary.

The vehicle 10 further includes a vehicle engine having an engine ECM 21 as shown in FIG. 1. The engine generates a torque output of the vehicle 10 in accordance with the operation of the vehicle pedal 20 by the driver. The vehicle engine generates a torque output that is created by the pistons within the engine as they reciprocate up and down along the engine's crankshaft. The torque output generated by the engine is then transferred to the wheels of the vehicle 10 through the transmission and drivetrain of the vehicle 10.

The vehicle 10 is further equipped with an electronic control unit ECU 19. In particular, the ECU 19 includes a processor 26 for controlling the operation of a temporary torque control system 25 of the vehicle 10, as will be further described. In the illustrated embodiment, the user operation device 18 (the vehicle pedal 20) is provided as part of the temporary torque control system 25 for the vehicle 10. The user operation device 18 is in connection with the ECU 19 to receive control information from the ECU 19 as shown in FIG. 2. In the illustrated embodiment, the ECU 19 can be considered an ECU 19 for the pedal 20 (or a pedal ECU) as the ECU 19 can control the torque output of the engine in response to operation of the pedal 20.

The vehicle 10 is further equipped with an engine control module ECM 21 for controlling the engine. The ECM 21 monitors the sensors in the engine bay (not shown) of the vehicle 10 in order to manage the air-fuel mixture of the vehicle 10 and regulate the emissions control of the engine, such as the air-fuel ratio, idle speed, variable valve timing, ignition timing, etc. Therefore, the ECM 21 controls sensors can detect the oxygen to fuel ratio in the exhaust of the vehicle 10 in order to determine an engine rich/lean reading. On-board sensor network 12 can further include mass air-flow sensor(s), the oxygen sensor(s), air-fuel sensor(s) that are in connection with the ECM 21. The on-board sensor network 12 preferably further includes sensors located by the crankshaft and camshafts of the vehicle 10 so that the ECM 21 can determine the idle speed of the vehicle 10, or the revolutions per minute (RPM) and engine load.

The vehicle 10 can include an internal combustion engine. Alternatively, the vehicle 10 can be a hybrid or an electric vehicle, or be operated by a hydrogen powertrain. Therefore, the ECM and the torque control operation described herein can be provided for any of these types of vehicles.

Therefore, the onboard sensor network 12 also includes a vehicle speed sensor 28 and a torque sensor 30. The vehicle speed sensor 28 is configured to measure the transmission output of the vehicle 10 or can measure wheel speed in a conventional manner. Therefore, the vehicle speed sensor 28 is configured to detect a current speed of the vehicle 10. The torque sensor 30 can be a torque transducer that is capable of measuring and monitoring the torque on a rotating system, such as the crankshaft of the engine. The torque sensor 30 can convert a torsional mechanical input into an electrical output signal. Therefore, the torque detector is configured to detect a current torque of the vehicle 10. In the illustrated embodiment, the vehicle speed sensor 28 and the torque sensor 30 are in electrical communication with the ECU 19 to send and receive signals to and from the ECU 19. These sensors controlled by the ECM 21 can be considered part of the internal sensors 14 of the on-board sensor network 12.

As best seen in FIG. 4, the vehicle 10 of the illustrated embodiment further includes a pedal position sensor 32 that can be part of the onboard sensors. The pedal position sensor 32 is capable of monitoring the position of the vehicle pedal 20. The pedal position sensor 32 sends an electronic signal to the ECU 19 to open the throttle body as the driver depresses the pedal 20. Therefore, the pedal position sensor 32 is also in electrical communication with the ECU 19. In the illustrated embodiment, the temporary torque control system 25 includes the engine, the vehicle pedal 20, the pedal position sensor 32, the vehicle speed sensor 28 and the torque sensor 30. As shown, the vehicle 10 can further include a wheel position sensor 34 for detecting operation of the steering wheel 22 that is in communication with the ECU 19. Therefore, the ECU 19 can control a torque output of the vehicle 10 depending on wheel position as desired. Tims, the temporary torque control 25 of the illustrated embodiment can be implemented with either a steering wheel 22 or a vehicle pedal 20. For simplicity, this description will focus on controlling the torque output of the vehicle 10 in response to pedal 20 operation.

Figure 5:
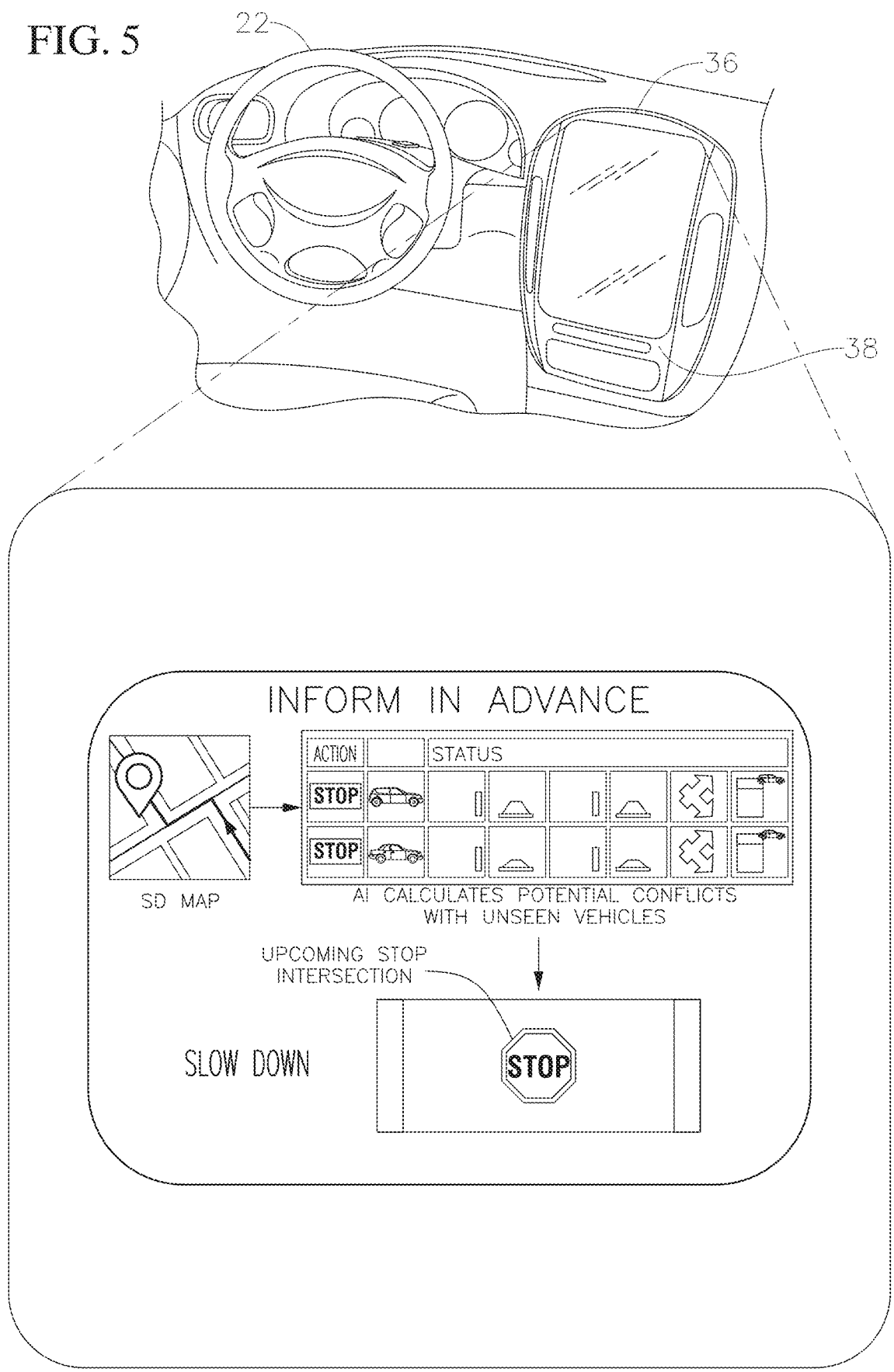
FIG. 5 is a partial view of an interior compartment of the vehicle having a display device configured to display notification data for the temporary torque control system.

Referring to FIG. 5, the vehicle 10 is preferably further equipped with an electric display device 36 that is provided within the interior compartment of the vehicle 10, as seen in FIG. 5. The display device 36 can include a single type display, or multiple display types (e.g., both audio and visual) configured for human-machine interaction. The display device 36 include any type of display panel as desired to display notification data, navigation data and other information.

Therefore, the display device 36 can be one or more dashboard panels configured to display lights, text, images or icons. Alternatively, the display device 36 can include a heads-up display. Thus, the display device 36 can be directly mounted onto the vehicle 10 body structure, or mounted onto the windows panels. The display device 36 can alternatively be provided on a mobile device that is synced with the control modules of the vehicle 10. The display device 36 can have different shapes and sizes to accommodate the shape and contours of the vehicle 10. The display device 36 is also in electrical connection with the ECU.

As best seen in FIG. 5, the display device 36 further includes a set of user input interfaces 38 to communicate with the driver. The display device 36 is configured to receive user inputs from the vehicle's 10 occupants. The display device 36 can include, for example, control buttons and/or control buttons displayed on a touchscreen display (e.g., hard buttons and/or soft buttons) which enable the user to enter commands and information for use by the ECU to control various aspects of the vehicle 10. For example, the input interface can be used by the ECU to monitor the climate in the vehicle 10, interact with the navigation system, control media playback, or the like. The display device 36 can also include a microphone that enables the user to enter commands or other information vocally. The display device 36 can further include one or more speakers that provide sound alerts and sound effects including computer-generated speech.

As stated, the temporary torque control system 25 includes the user operation device 18, such as the vehicle pedal 20 and the steering wheel 22. As best seen FIG. 4, each of the vehicle pedal 20 and the steering wheel 22 are preferably equipped with a wireless communication device that is in communication with the ECU to send and receive messages from the ECU.

The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle 10 field. Here, the wireless communication device can be a one-way wireless communication unit such as a transmitter.

While the vehicle 10 is illustrated as including two examples of user operation device 18s, it will be apparent to those skilled in the vehicle 10 field from this disclosure that that the vehicle 10 can only be equipped with any one of the user operation device 18s individually. For simplicity in this disclosure, the term "user operation device 18" will hereafter refer to the vehicle pedal 20. In the illustrated embodiment, the ECU can be considered a pedal 20 electronic control unit (a pedal ECU). However, it will be apparent to those skilled in the vehicle field from this disclosure that the ECU can be equipped to control several other physical components, including the steering wheel 22 and the display device 36, of the vehicle 10.

The vehicle 10 can include more than one on-board ECUs for controlling different systems of the vehicle 10, although one is illustrated and described for simplicity. The ECU has a non-transitory computer-readable medium MEM. The ECU further includes the processor 26 with microprocessor programmed to perform control functions that will be further discussed below.

The vehicle pedal 20 of the illustrated embodiment is preferably an e-Pedal 20 that is capable of starting, accelerating, decelerating and braking operations. That is, the vehicle pedal 20 preferably allows the driver to launch, accelerate/decelerate and stop the vehicle 10 by operating only the vehicle pedal 20. The pedal 20 can be operated to accelerate the vehicle 10 by being pressed down. When the driver decreases pressure on the pedal 20 by lifting off of the pedal 20, the vehicle 10 will decelerate and eventually come to a complete stop. After the vehicle 10 comes to a complete stop, the hydraulic brake system preferably is automatically activated to keep the car stationary.

The e-Pedal 20 state of the vehicle pedal 20 can be activated via a switch that is part of the user interface of the dashboard. When the e-Pedal 20 state is not activated, the vehicle pedal 20 can operate as a conventional accelerator pedal 20. The pedal 20 is equipped with the pedal position sensor 32 and the wireless control unit that is in communication with the ECU to receive control messages from the ECU, as will be further described below.

Figure 6:
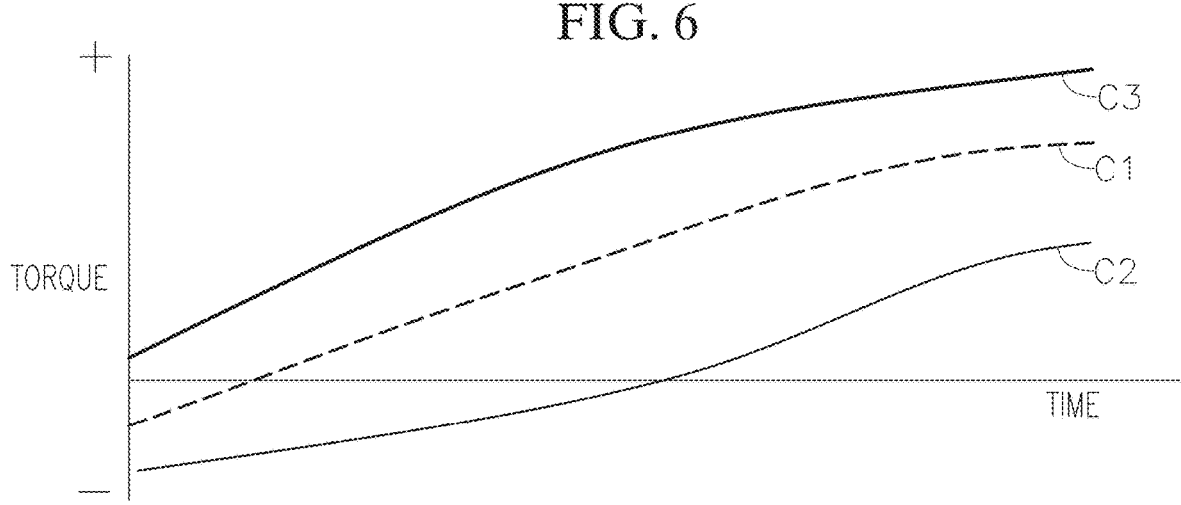
FIG. 6 is a sample torque control graph having a plurality of torque control curves.

In the illustrated embodiment, the ECU controls the vehicle pedal 20 between a normal state, an increased resistance state and a decreased resistance state based on one or more of the real-time information, the additional real-time information, the crowdsourced information and the predetermined information. The normal state is a default state in which the ECU generates a default torque control of the vehicle 10 in response to operation of the vehicle pedal 20. In the normal state, the output torque generated by the engine corresponds to a pedal position of the pedal 20. For example, FIG. 6 illustrates a first sample torque graph for the controlling the torque of the vehicle 10 during an acceleration event. The ECU can control the vehicle 10 in accordance with a first torque control curve C1 of the first sample torque graph when in the normal state.

When in the increased resistance state and the decreased resistance state, the ECU controls the torque output of the engine such that the torque output does not correspond with the pedal position as in the normal state. Rather, the engine generates greater torque output when the vehicle pedal 20 is in the decreased resistance state than when in the normal state and the increased resistance state. The engine generates less torque output when the vehicle pedal 20 is in the increased resistance state than when the normal state and the decreased resistance state.

Therefore, the vehicle pedal 20 is less sensitive to driver pressure in the increased resistance state. In the increased resistance state, the ECU controls the vehicle 10 to accelerate at a slower rate than in the normal state. In the example of FIG. 6, the ECU can control the vehicle 10 in accordance with a second torque control curve C2 when in the increased resistance state. In particular, the ECU can initiate the increased resistance state upon determining reason for caution in the vehicle 10 vicinity, as determined by the environmental sensors 16 and/or information received by any of the NAV or the TCU. For example, in the event that the driver wants to accelerate immediately upon crossing an intersection but the environment sensors detect pedestrians nearby, the ECU can control the vehicle pedal 20 in accordance with the increased resistance state.

The vehicle pedal 20 is more sensitive to driver pressure in the decreased resistance state. In the example of FIG. 6, the ECU can control the vehicle 10 in accordance with a third torque control curve C3 when in the increased resistance state. In the above example, when the vehicle 10 determines that the vicinity has been cleared of pedestrians or potential pedestrians, the ECU can control the vehicle pedal 20 to control the vehicle 10 to accelerate at a faster rate for a period of time. The control of the vehicle pedal 20 will be further discussed below.

Referring again to FIGS. 1 to 3, the vehicle's 10 control modules for navigation assistance will now be further discussed. In particular, the on-board satellite navigation device NAV is in communication with a global positioning system unit (GPS) to acquire real-time information regarding conditions near the vehicle's 10 vicinity. In the illustrated embodiment, the term "vehicle vicinity" refers to an area within a two hundred meter distance to a one mile distance of the vehicle 10 from all directions. In the illustrated embodiment, the term "vehicle 10 vicinity" includes an area that is upcoming on the vehicle's 10 navigation course.

The on-board satellite navigation device NAV can be a global navigation satellite system (GNSS) receiver or GPS receiver that is capable of receiving information from GNSS satellites then calculate the device's geographical position. Therefore, the on-board satellite navigation device NAV acquires GPS information for the vehicle 10.

Figure 3:
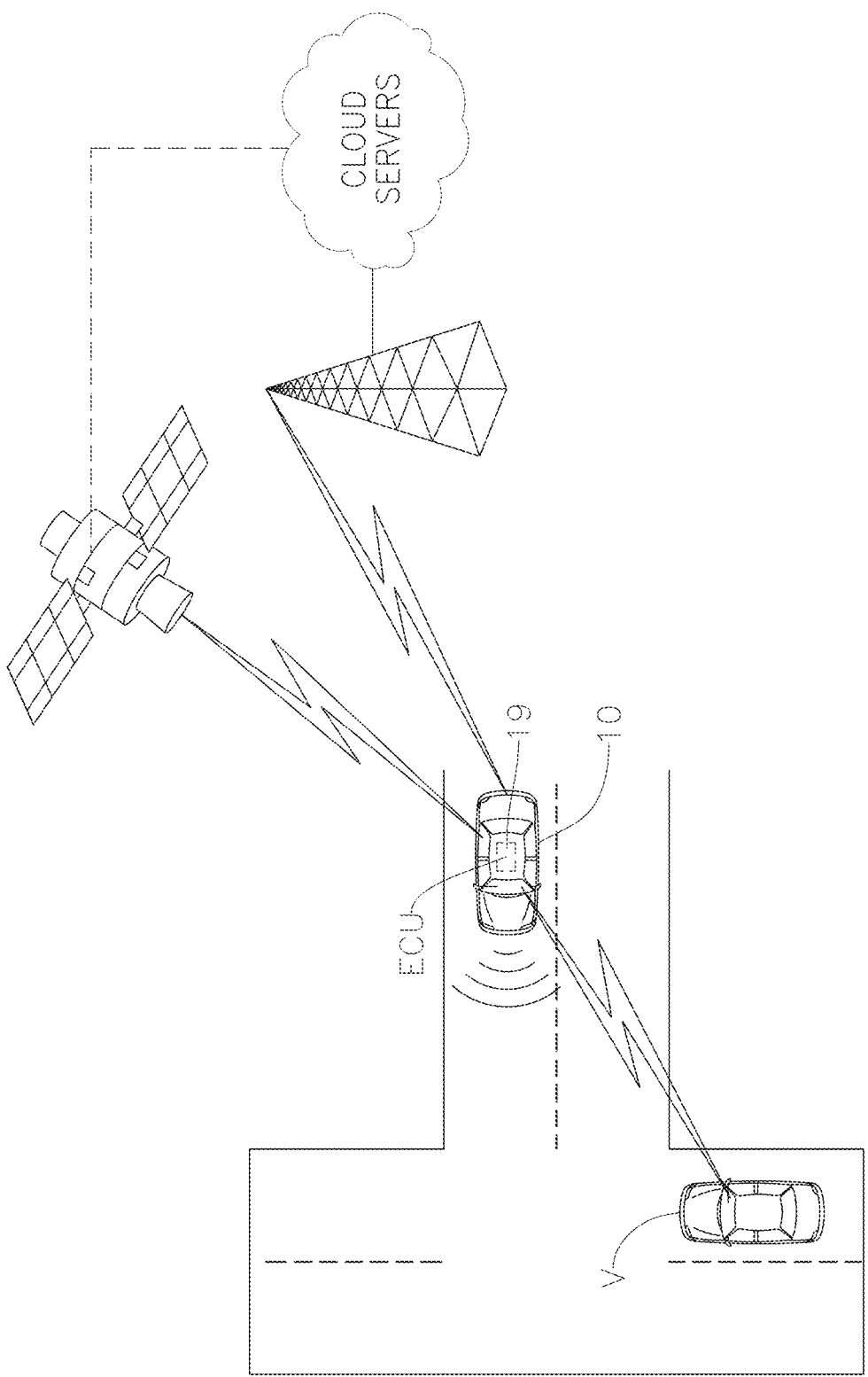
FIG. 3 is a schematic view of the vehicle as being in communication with a GPS server, a cloud server and a vehicle network.

As shown in FIG. 3, the on-board satellite navigation device NAV can also be in communication with a Wide Area Augmentation System (WAAS) enabled National Marine-Electronics Association (NMEA) unit, a radio triangulation unit, or a combination thereof. The on-board satellite navigation device NAV can obtain information that represents, for example, a current heading of the vehicle 10, a current position of the vehicle 10 in two or three dimensions, a current angular orientation of the vehicle 10, or a combination thereof. In this way, the on-board satellite navigation device NAV captures real-time information regarding conditions regarding the vehicle 10 vicinity.

As seen in FIG. 3, the telematics control unit TCU is in wireless communications to at least one of a cloud server and a vehicle network to upload and receive crowdsourced information regarding conditions near the vehicle's 10 vicinity. The TCU receives the crowdsourced information which are preferably automatically stored into the non-transitory computer-readable medium MEM, as will be further described. Data from on-board electronic control units ECU, the on-board sensors can also be transmitted by the TCU to the cloud server or to the vehicle network. That is, the vehicle's 10 location, method of traversal and own experience on a navigation path can also be transmitted to the cloud server or the cloud network.

The TCU is an embedded computer system that wirelessly connects the vehicle 10 to cloud services or other the vehicle network via vehicle 10-to-everything (V2X standards) over a cellular network. The TCU collects telemetry data regarding the vehicle 10, such as position, speed, engine data, connectivity quality etc. by interfacing with various subsystems and control busses in the vehicle 10. The TCU can also provide in-vehicle 10 connectivity via Wi-Fi and Bluetooth. The TCU can include an electronic processing unit, a microcontroller, a microprocessor 26 or field programmable gate array (FPGA), which processes information and serves to interface with the GPS unit. The TCU can further include a mobile communication unit and memory for saving GPS values in case of mobile-free zones or to intelligently store information about the vehicle 10's sensor data. Therefore, the memory that stores the information from the TCU can either be part of the TCU or the vehicle's 10 on-board ECU.

Using the TCU, the vehicle 10 can communicate with one or more other vehicle (e.g., the vehicle network), as seen in FIG. 3. For example, the TCU is capable of receiving one or more automated inter-vehicle 10 messages, such as a basic safety message (BSM), from a remote vehicle V via a network communicated using the TCU. Alternatively, the TCU can receive messages via a third party, such as a signal repeater (not shown) or another remote vehicle (not shown). The TCU can receive one or more automated inter-vehicle messages periodically, based on, for example, a defined interval, such as 100 milliseconds.

Automated inter-vehicle messages received and/or transmitted by the TCU can include vehicle identification information, geospatial state information (e.g., longitude, latitude, or elevation information, geospatial location accuracy information), kinematic state information (e.g., vehicle acceleration information, yaw rate information, speed information, vehicle heading information, braking system status information, throttle information, steering wheel angle information), vehicle routing information, vehicle operating state information (e.g., vehicle size information, headlight state information, turn signal information, wiper status information, transmission information) or any other information, or combination of information, relevant to the transmitting vehicle state. For example, transmission state information may indicate whether the transmission of the transmitting vehicle is in a neutral state, a parked state, a forward state, or a reverse state.

The TCU can also communicate with the vehicle network via an access point. The access point can be a base station, a base transceiver station (BTS), a Node-B, an enhanced Node-B (eNode-B), a Home Node-B (HNode-B), a wireless router, a wired router, a hub, a relay, a switch, or any similar wired or wireless device. The vehicle 10 can communicate with the vehicle network via the NAV or the TCU. In other words, the TCU can be in communication via any wireless communication network such as high bandwidth GPRS/1× RTT channel, a wide area network (WAN) or local area network (LAN), or any cloud-based communication, for example. Therefore, using the TCU, the vehicle 10 can participate in a computing network or a cloud-based platform.

The cloud server and/or the vehicle network can provide the vehicle 10 with information that is crowdsourced from drivers, pedestrians, residents and others. For example, the cloud server and/or the vehicle network can inform the vehicle 10 of a live concert with potential for large crowds and traffic congestion along the path on or near the vehicle's 10 travel route. The cloud server and/or the vehicle network can also inform the vehicle 10 of potential pedestrians along the path on or near the vehicle's 10 travel route such as children getting off from school based on school location with respect to the vehicle's 10 navigation path and the current time. The cloud server and/or the vehicle network can also inform the vehicle 10 of conditions of general oncoming traffic, oncoming signs and lights, incoming lanes, restricted lanes, road closures, construction sites, potential vehicle 10 encounters, accidents, and potential pedestrian encounters, etc.

The crowdsourced information obtained from the cloud server and/or the vehicle network can also include intersection geometry tags for locations pre-identified or computed to be difficult or poor visibility at junctions (based on geometric calculations, or crowdsourced data from other vehicle 10s). The TCU can also inform the vehicle 10 of information received from a transportation network and/or a pedestrian network to receive information about pedestrian navigable area, such as a pedestrian walkway or a sidewalk, may correspond with a non-navigable area of a vehicle 10 transportation network.

The vehicle network can include the one or more transportation networks that provides information regarding unnavigable areas, such as a building, one or more partially navigable areas, such as parking area, one or more navigable areas, such as roads, or a combination thereof. The vehicle 10 transportation network may include one or more interchanges between one or more navigable, or partially navigable, areas.

The non-transitory computer medium preferably stores information such as navigation maps or road condition maps on the vehicle 10 for at least a period of time. This information can be downloaded from the cloud server and/or the vehicle network server monthly, weekly, daily, or even multiple times in a drive, but would need to be stored locally for processing by the driver support system. Therefore, the non-transitory computer-readable medium MEM preferably stores regularly updated maps with information about activities that can be encountered by the vehicle 10, such as neighborhood information. The non-transitory computer medium preferably stores information that are downloaded from the cloud server and/or the vehicle network. This information is in conjunction with the real-time information acquired by the NAV (e.g., the GPS data). The processor 26 controls automatic download of information from the cloud server and/or the vehicle network at regular intervals.

Therefore, it will be apparent to those skilled in the vehicle field from this disclosure that the ECU can be connected to various control systems and control modules of the vehicle 10 (such as the engine control module, etc.) to determine the vehicle's 10 condition, etc.

In the illustrated embodiment, the non-transitory computer-readable medium MEM stores predetermined information regarding conditions near the vehicle 10 vicinity. In particular, the non-transitory computer-readable medium MEM stores predetermined vehicle navigation scenarios and torque condition controls for controlling the torque output of the engine, as will be further described below. The predetermined information can also include a database of road or navigation conditions, as will be further described below.

The user can input preferences for the temporary torque control system 25 into the input interfaces 38. For example, the user can activate/deactivate the temporary torque control system 25 using the input interfaces 38.

The temporary torque control system 25 is provided to help inform drivers of oncoming road conditions and conditions regarding the vehicle's 10 vicinity in order to help the driver make better driving decisions. Preferably, the temporary torque control system 25 of the illustrated embodiment enables the technical improvement of the vehicle 10 that can better avoid risky maneuvers in areas prone to accident or danger.

In the illustrated embodiment, the temporary torque control system 25 is controlled by the processor 26 of the ECU. The processor 26 can include any device or combination of devices capable of manipulating or processing a signal or other information now-existing or hereafter developed, including optical processors, quantum processors, molecular processors, or a combination thereof. For example, the processor 26 can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. As seen in FIG. 2, the processor 26 is operatively coupled with the computer-readable medium MEM, the input interface, the sensor network, the TCU, the NAV and the display device 36.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" or "computer-readable medium MEM" (also referred to as a processor-readable medium) indicates any computer-usable or computer-readable medium MEM or device that can tangibly contain, store, communicate, or transport any signal or information that may be used by or in connection with any processor 26. For example, the computer-readable medium MEM may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor 26 of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer-readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The processor 26 can executed instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by a processor 26 to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor 26 receives instructions from the computer-readable medium MEM and executes these instructions, thereby performing one or more processes, including one or more of the processes described herein. Such instructions and other data may be stored and transmitted using a variety of computer-readable media.

For example, the processor 26 can also use information from the environmental sensors 16 to identify, the type of road (e.g., type of lanes and lane segments, urban or highway), difficulty of traversal of lane(s) and lane segment(s), density of traffic, the level of the density, etc.

In the illustrated embodiment, the processor 26 is programmed to anticipate information regarding upcoming conditions near the vehicle 10 vicinity based on one or more of the real-time information received from the on-board satellite navigation device NAV, the crowdsourced information and the predetermined information (stored in the computer-readable medium MEM). The processor 26 is programmed to predict and anticipate oncoming road conditions within the vehicle 10 vicinity based on the real-time information received from the on-board satellite navigation device NAV, the crowdsourced information and the predetermined information.

Preferably, the processor 26 can anticipate or predict oncoming road conditions by also calculating geometric arrangements of road conditions based on the real-time information, the crowdsourced information and the predetermined information. In this way, the processor 26 can determine occlusions and control the torque of the vehicle 10 accordingly.

As stated, the non-transitory computer-readable medium MEM stores predetermined information. For example, the non-transitory computer-readable medium MEM includes one or more database of road conditions, situations or navigation scenarios. The database can include a set of road feature parameters that can be applicable for almost all navigation paths along a road feature or intersection (e.g., intersection type, ongoing traffic control(s), lane types and numbers, lane angles, etc.). The database can optionally further include a set of path parameters (e.g., straight, left turn, right turn, U-turn, etc.). That is, the computer-readable medium MEM stores a database of navigation scenarios that can require increased deceleration or acceleration on a temporary basis. The database can be compared with the real time navigation scenarios of the vehicle 10 in order to inform the temporary torque control system 25 of appropriate torque control of the vehicle 10.

In these examples, the processor 26 can determine the navigation path of the vehicle 10 based on information received from the NAV and the on-board sensor network 12 that monitors real-time vehicle 10 activity. The processor 26 is programmed to anticipate upcoming situations that can be encountered by the vehicle 10 based on the vehicle's 10 direction of travel, time, speed, etc. The processor 26 is further programmed to compare the upcoming situations that are anticipated with the database of navigation scenarios that are stored in the computer-readable medium MEM. When there is a match, the processor 26 can control the vehicle 10 torque accordingly.

Figure 9:
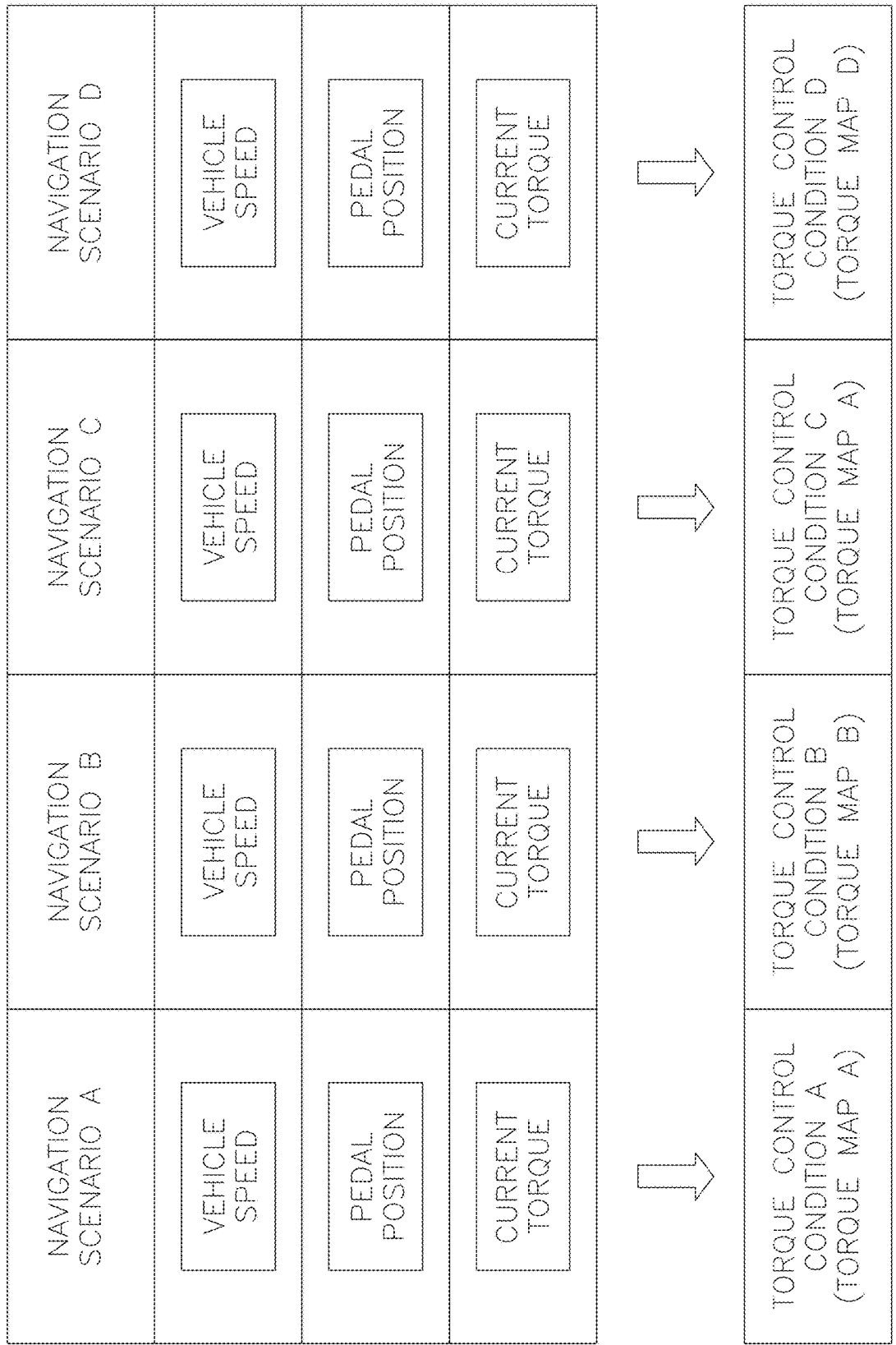
FIG. 9 is a sample database of prestored information that can be stored in a computer readable medium of the temporary torque control system.

FIG. 9 illustrates an example of a database that can be prestored in the MEM having samples of prestored navigation scenarios having prestored (built in) torque control curves (or torque maps) for each scenario. The processor 26 of the ECU can compare a detected upcoming scenario with any of the prestored scenarios in the database. The database is preferably a 3-D matrix including factors such as upcoming scenario, pedal's 20 position, current vehicle speed and torque output, that are matched with an appropriate torque control curve for those concurrent situations. Therefore, the ECU preferably controls the pedal 20 to adjust the torque control of the vehicle 10 in accordance with a state of the vehicle 10 vicinity (as detected by any of the NAV, TCU or the sensor network 12), the pedal's 20 position of the pedal 20, a detected current vehicle speed, and a detected current torque output.

Figure 7:
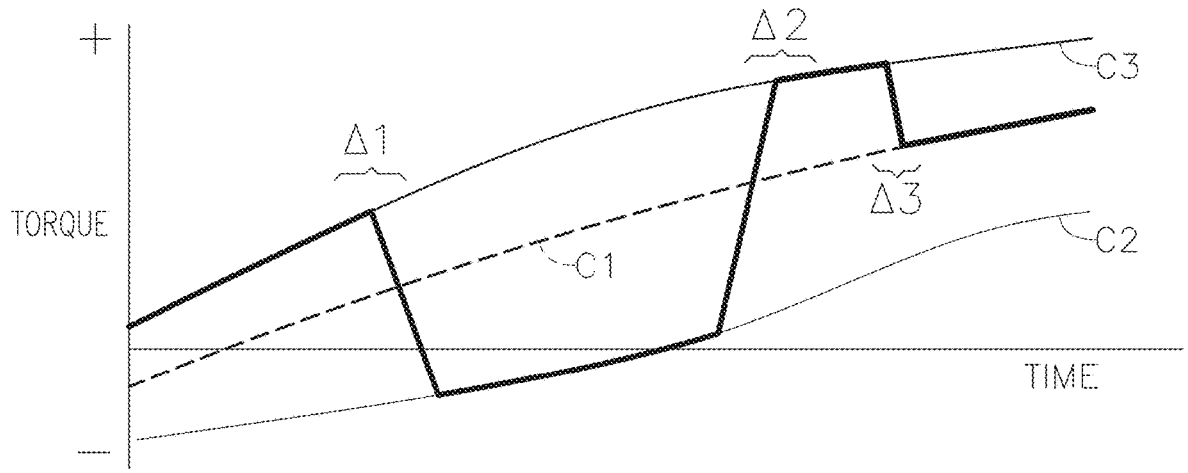
FIG. 7 is a sample torque control graph similar to FIG. 6 showing a transition from one torque control to another.
Figure 10:
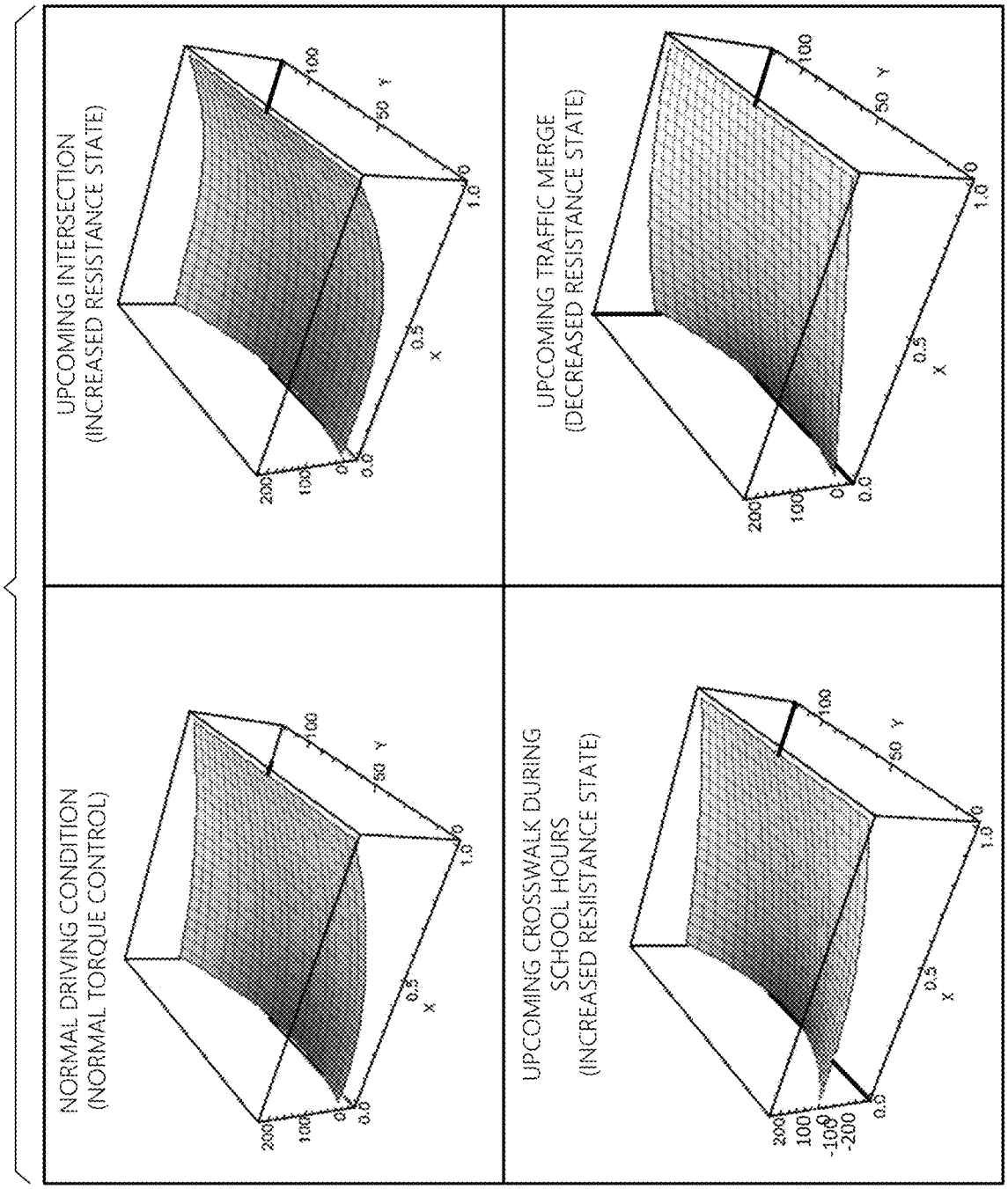
FIG. 10 is another sample database of prestored information that can be stored in the computer readable medium of the temporary torque control system.

As seen in FIGS. 9 and 10, the computer-readable medium MEM further stores one or more of a plurality of predetermined torque condition controls. In the illustrated embodiment, the torque control condition can be a torque map or a torque curve that the ECU selects for controlling the torque output. The predetermined torque condition controls are matched up with different navigation scenarios, the pedal's 20 positions, vehicle speeds, and torque outputs from the engine. Each of the vehicle navigation scenarios correspond with a predetermined torque condition control that are also stored in the computer-readable medium MEM. As seen in FIG. 10, examples of vehicle navigation scenarios are listed with corresponding torque condition controls. As shown, the predetermined torque condition controls include torque maps. Alternatively, the predetermined torque condition controls can be torque curves, as seen in FIGS. 5 to 7. Therefore, these predetermined torque condition controls can be converted to electronic control signals that are sent by the ECU to control the torque output of the engine.

As seen in FIG. 9, the MEM further stores a plurality of pedal positions. The pedal positions also correspond with a predetermined torque control condition (e.g., torque map or torque curve). The MEM further stores a plurality of vehicle speeds. Each of the vehicle speeds also correspond with a predetermined torque control condition that is stored in the MEM. The MEM preferably further stores a plurality of torque outputs. Each of the torque outputs correspond with a predetermined torque control condition.

The database illustrated in FIG. 9 is a sample only. Preferably, as stated, the MEM stores a 3-D matrix of predetermined torque control conditions that concurrently correspond with the navigation scenario, pedal position, vehicle speed and torque output. That is, the ECU selects a torque control condition for controlling the engine output due to pedal 20 operation by concurrently matching up the appropriate navigation scenario, pedal position, vehicle speed and the torque output of the engine.

Therefore, the ECU is programmed to compare an upcoming vehicle scenario (detected by the NAV, TCU or the on board sensor network 12) with the vehicle navigation scenarios that are prestored in the non-transitory computer-readable medium MEM in order to determine a matching torque control condition for the vehicle 10 scenario. The ECU also compares a current torque detected by the torque detector with the plurality of torque outputs that are prestored in the MEM in order to determine a matching torque control condition. The ECU is further programmed to compare a current vehicle speed detected by the vehicle speed sensor 28 with the plurality of vehicle speeds that are prestored in the MEM in order to determine a matching torque control condition for the current vehicle speed. The ECU is further programmed to compare a current pedal position detected by the pedal position detector with a plurality of pedal positions that are prestored in the MEM in order to determine a matching torque control condition for the current pedal position.

The ECU preferably compares all of these factors at once and finds the appropriate torque control condition that takes into account the vehicle's 10 navigation scenario, vehicle speed, pedal position and torque output on a concurrent basis. Therefore, the ECU controls the vehicle pedal 20 in accordance with the matching prestored torque control condition for these factors.

When the processor 26 determines a match, the processor 26 can control the pedal 20 in accordance with the appropriate torque control curve or the torque control map. Preferably, the database includes one or more torque control curve identification codes for each scenario. The processor 26 can match up the torque control curve identification code for each scenario to generate the appropriate torque curve for controlling the torque output. The ECU will send the appropriate control signal to the pedal ECU for controlling the pedal 20 upon finding the appropriate torque control curve.

Figure 8:
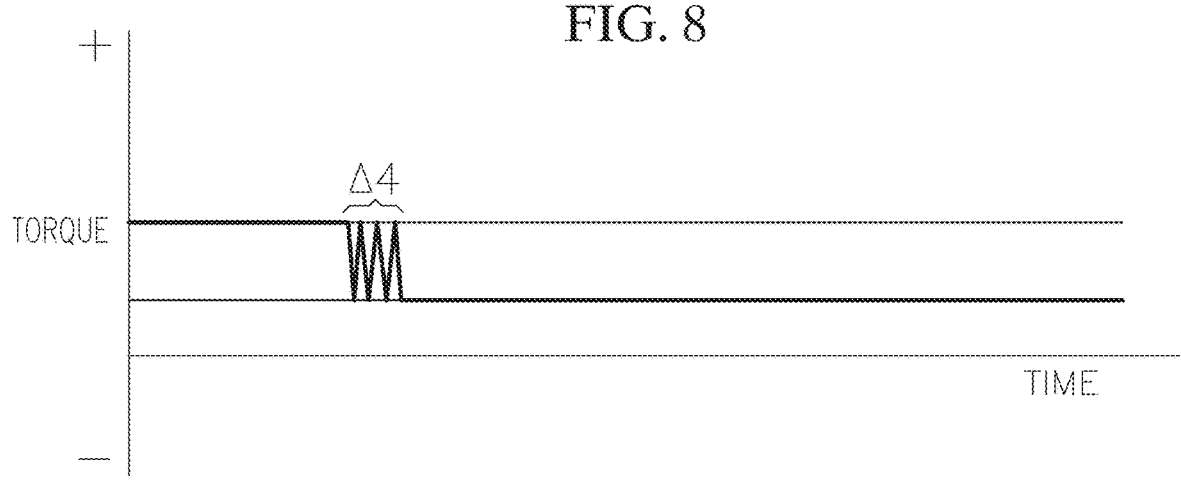
FIG. 8 is another sample torque control graph.

Referring to FIGS. 7 and 8, the ECU can also control the transition of one torque control curve to another torque control, as shown. That is, the ECU can send a transition signal Δ to the pedal ECU to transition from one torque control curve to another torque control curve when appropriate. For example, the ECU can control the pedal 20 in accordance with the torque control curve C3 during an acceleration event. The on-board sensor network 12 can detect a pedestrian crossing in the vehicle 10 vicinity that can be an upcoming event. The ECU can then send a transition signal Δ1 to transition to the second torque control curve C2 in order to decelerate the vehicle 10. Once the sensor network 12 determines that the upcoming lane(s) are clear, the ECU can send a transition signal Δ2 to transition to the torque control curve C3 in order to accelerate the vehicle 10 once again. After a predetermined period (e.g., five to ten seconds), the ECU can automatically send a transition signal Δ3 to initiate torque control wider the torque control curve C1 in which the pedal 20 is back into the default state.

By sending transition signals, the ECU of the temporary torque control system 25 can enable the technical improvement of smoother transitions between the normal state, the increased resistance state and the decreased resistance state of the pedal 20.

Alternatively, the ECU can be programmed to continuously send a default signal Δ4 to the pedal ECU (e.g., signals at 10 Hz, 100 Hz, or any convenient rate) parameters to transition between torque control graphs at predetermined times. For example, as seen in FIG. 8, the ECU can send the default signal Δ4 to transition from the third torque control curve C3 to the first torque control curve C1. By continuously sending a default signal Δ4 to the pedal ECU, the temporary torque control system 25 can enable the technical improvement of the eliminating the need to store intermittent transition signals (e.g., transition signal Δ3) in the MEM of the ECU.

Additionally, the ECU can be programmed to receive transition signals of curves intermediate to C1 and C3 at a desired transmission rate is to smooth the transition externally in another ECU in order to shift the torque curves.

In the illustrated embodiment, the ECU can also control the user operation device 18s to generate a haptic notification to the driver. For example, the ECU can control the vehicle pedal 20 to vibrate to send a message to a driver who may be speeding or engaging in unsafe maneuvers. Similarly, the ECU can control the driver's seat and the steering wheel 22 to vibrate to alert the driver of risky driving behavior.

In the illustrated embodiment, the term "haptic notification" will refer any notification that is tactile in nature or pertaining to a sense of touch, and can include any notification provided by means of forces, vibrations or motions. Therefore, the pedal 20 can be equipped with a haptic motor to receive input signals from the ECU as necessary. In particular, the processor 26 of the ECU is programmed to control the user operation device 18 based on one or more of the real-time information, the crowdsourced information and the predetermined information, as will be further described below. The processor 26 of the ECU is preferably further programmed to control the display device 36 to concurrently send notification data regarding the condition of the vehicle 10 vicinity based on one or more of the real-time information, the crowdsourced information and the predetermined information, as best seen in FIG. 6.

In the illustrated embodiment, "notification data" can include warnings, alerts, recommended maneuvers, road information, etc. In the illustrated embodiment, the processor 26 is programmed to control the electronic display device 36 to display the notification data. In particular, the processor 26 is programmed to control the electronic display device 36 to display notification data regarding the condition of the vehicle's 10 vicinity based on one or more of the real-time information, the crowdsourced information and the predetermined information.

For example, if the environmental sensors 16 detect an upcoming STOP sign but determines that the vehicle 10 has not decelerated, the processor 26 can control the acceleration pedal 20 to vibrate, as shown in FIG. 5. At the same time, the processor 26 can control the display device 36 to display notification data to the driver that the vehicle 10 is approaching a STOP sign and to recommend slowing down, as shown in FIG. 6.

Therefore, the ECU also controls the electronic display device 36 and the user operation device 18 to preferably work in tandem provide notification data to the driver.

In another example, a haptic alert may include haptic feedback from the steering wheel 22 or the driver seat or any combination thereof. An example of haptic feedback may include automatically adjusting the sensitivity or resistance of the vehicle pedal 20, the brake pedal 20, or both, to encourage safe driving habits and discourage aggressive driving habits. For example, good behavior may be rewarded with lower pedal 20 resistance, and bad behavior may result in increased pedal 20 resistance.

Figure 11:
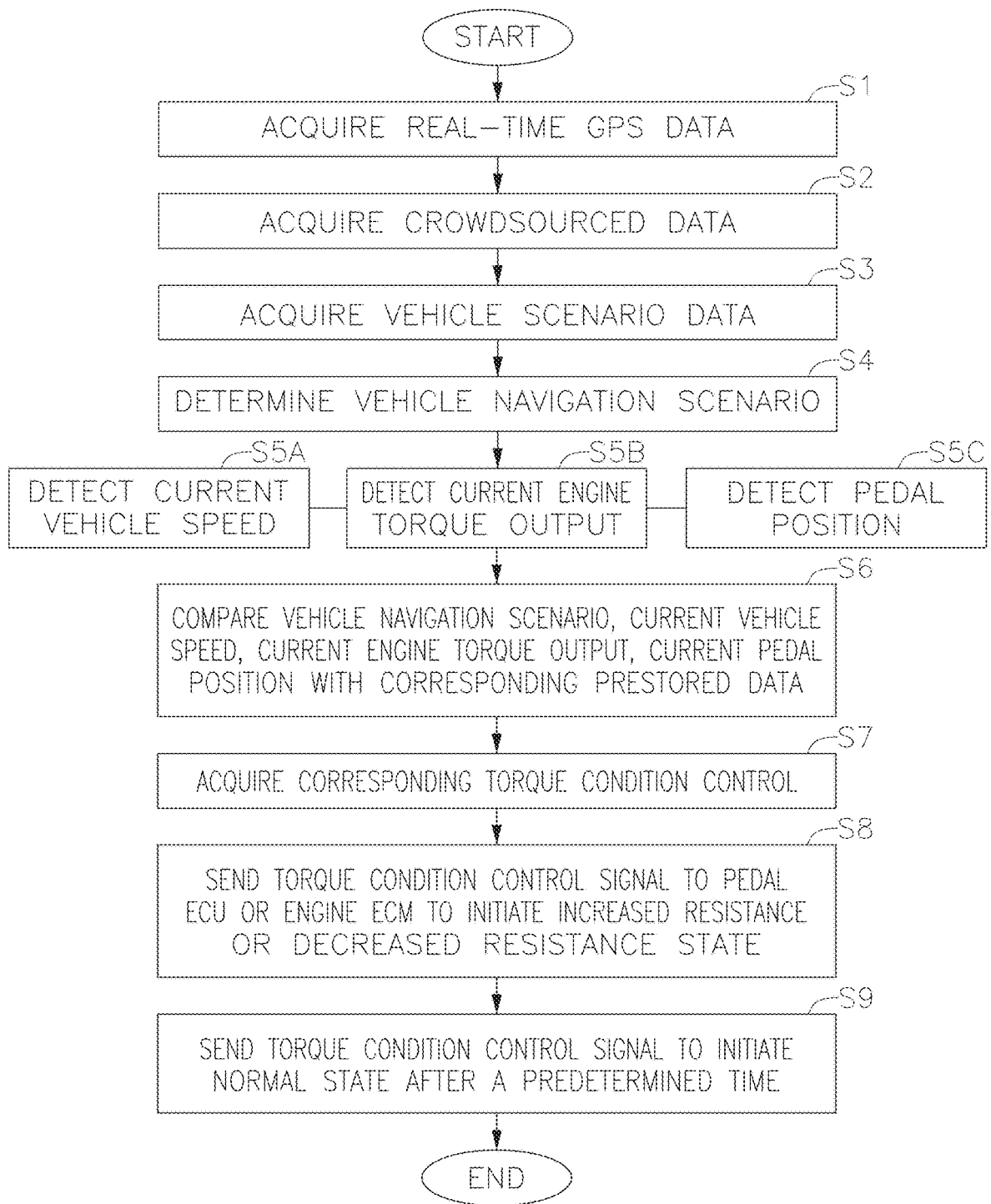
FIG. 11 is a flowchart of a method that can be executed by a processor of the temporary torque control system.

Referring to FIG. 11, a method for controlling the torque output from pedal 20 operation is illustrated. The method can be carried out by the processor 26 of the temporary torque control system 25. In step S1, the method comprises acquiring real-time information regarding conditions near the vehicle's 10 vicinity from the on-board satellite navigation device NAV. That is, the method comprises acquiring GPS data. In step S2, the method further comprises acquiring crowdsourced information regarding conditions near the vehicle's 10 vicinity from the TCU. Therefore, the method further comprises acquiring information from the cloud server or the vehicle network. In step S3, the processor 26 acquires vehicle 10 scenario data such as data regarding the vicinity of the vehicle 10 that is detected by the environmental sensors 16.

In step S4, the processor 26 also determines a vehicle navigation scenario from the NAV, such as acquiring GPS data. In steps S5A, S5B and S5C, the processor 26 determines the vehicle speed, the engine torque output and the pedal position, respectively. In step S6, the processor 26 compares the factors detected in steps S1 to S5A-C with the prestored information stored in the MEM, such as examples shown in FIGS. 9 and 10.

In step S7, once the processor 26 makes a comparison or a snatch in step S6, the processor 26 can determine the corresponding torque condition control for controlling the pedal 20 based on the match. In step S8, the processor 26 then sends a torque control signal to the engine ECM to control the engine torque output accordingly. In this step, the ECM controls the engine torque output that does not correspond to the pedal position so that the pedal 20 operates in the increased resistance state or the decreased resistance state. In step S9, after a predetermined time, the processor 26 automatically sends a signal to the ECM to control the engine to return to the normal state that corresponds with the pedal position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the temporary torque control system. Accordingly, these terms, as utilized to describe the present invention should be interpreted relative to a vehicle equipped with the temporary torque control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
   a vehicle pedal;
   a vehicle engine generating a torque output of the vehicle in accordance with an operation of the vehicle pedal,
   an electronic control unit controlling the vehicle pedal between a normal state, an increased resistance state and a decreased resistance state, the vehicle pedal being less sensitive to driver pressure in the increased resistance state and the vehicle pedal being more sensitive to driver pressure in the decreased resistance state, the vehicle engine generating torque output based on: a first torque control curve if the vehicle pedal is in the normal state, a second torque control curve if the vehicle pedal is in the increased resistance state, and a third torque control curve if the vehicle pedal is in the decreased resistance state, each of the first torque control curve, the second torque control curve and the third torque control curve being different from each other; and
   wherein the engine generates greater torque output when the vehicle pedal is in the decreased resistance state than when in the normal state and the increased resistance state, and
   the engine generates less torque output when the vehicle pedal is in the increased resistance state than when in the normal state and the decreased resistance state.

2. The vehicle according to claim 1, further comprising an on-board satellite navigation device in communication with a global positioning system unit to acquire real-time information regarding conditions near the vehicle's vicinity;
   a telematics control unit in wireless communications to at least one of a cloud services and a vehicle network to upload and receive crowdsourced information regarding conditions near the vehicle's vicinity;
   a non-transitory computer readable medium storing predetermined information regarding conditions near the vehicle vicinity; and
   an on-board sensor network programmed to detect additional real-time information regarding conditions near the vehicle's vicinity.

3. The vehicle according to claim 2, wherein
   the electronic control unit controls the vehicle pedal between the normal state, the increased resistance state and the decreased resistance state based on one or more of the real-time information, the additional real-time information, the crowdsourced information and the predetermined information.

4. The vehicle according to claim 3, wherein
   the non-transitory computer readable medium further stores one or more of a plurality of predetermined torque control conditions.

5. The vehicle according to claim 4, wherein
   the non-transitory computer readable medium further stores a plurality of vehicle navigation scenarios, each of the vehicle navigation scenarios correspond with a predetermined torque control condition of the predetermined torque control conditions.

6. The vehicle according to claim 5, wherein
   the non-transitory computer readable medium further stores a plurality of pedal positions, each of the pedal positions correspond with a predetermined torque control condition of the predetermined torque control conditions.

7. The vehicle according to claim 6, wherein
   the non-transitory computer readable medium further stores a plurality of vehicle speeds, each of the vehicle speeds correspond with a predetermined torque control condition of the predetermined torque control conditions.

8. The vehicle according to claim 7, wherein
   the non-transitory computer readable medium further stores a plurality of torque outputs, each of the torque outputs correspond with a predetermined torque control condition of the predetermined torque control conditions.

9. The vehicle according to claim 8, wherein
   the on-board sensor network includes a vehicle speed sensor configured to detect a current speed of the vehicle.

10. The vehicle according to claim 9, wherein
    the on-board sensor network includes a torque sensor configured to detect a current torque of the vehicle.

11. The vehicle according to claim 10, wherein
    the electronic control unit is further programmed to compare an upcoming vehicle navigation scenario with the vehicle navigation scenarios that are prestored in the non-transitory computer readable medium in order to determine a matching torque control condition for the vehicle navigation scenario.

12. The vehicle according to claim 11, wherein the electronic control unit is further programmed to control the vehicle pedal in accordance with the matching prestored torque control condition for the vehicle navigation scenario.

13. The vehicle according to claim 12, wherein the electronic control unit is further programmed to compare a current torque of the vehicle with the plurality of torque outputs that are prestored in the non-transitory computer readable medium in order to determine a matching torque control condition for the current torque.

14. The vehicle according to claim 13, wherein the electronic control unit is further programmed to control the vehicle pedal in accordance with the matching prestored torque control condition for the current torque of the vehicle.

15. The vehicle according to claim 14, wherein the electronic control unit is further programmed to compare a current vehicle speed with the plurality of vehicle speeds that are prestored in the non-transitory computer readable medium in order to determine a matching torque control condition for the current vehicle speed.

16. The vehicle according to claim 15, wherein the electronic control unit is further programmed to control the vehicle pedal in accordance with the matching torque control condition for the current vehicle speed.

17. The vehicle according to claim 16, wherein the electronic control unit is further programmed to compare a current pedal position of the vehicle pedal with a plurality of pedal positions that are prestored in the non-transitory computer readable medium in order to determine a matching torque control condition for the current pedal position.

18. The vehicle according to claim 17, wherein the electronic control unit is further programmed to control the vehicle pedal in accordance with the matching torque control condition for the current pedal position.

19. The vehicle according to claim 2, wherein the electronic control unit is further programmed to control the vehicle pedal between the normal state, the increased resistance state and the decreased resistance state in accordance with the crowdsourced information that includes any one or more of a state of traffic congestion along the path on or near the vehicle's travel route, potential pedestrians along the path or near the vehicle's travel route, conditions of oncoming traffic and road conditions.

* * * * *